(12) United States Patent
Mykins et al.

(10) Patent No.: US 8,928,906 B2
(45) Date of Patent: Jan. 6, 2015

(54) METHOD AND APPARATUS FOR SECURING A PRINT JOB

(75) Inventors: Zachary Kyle Mykins, Fairport, NY (US); Kimberly Sue Stankey, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 114 days.

(21) Appl. No.: 13/440,461

(22) Filed: Apr. 5, 2012

(65) Prior Publication Data
US 2013/0265602 A1 Oct. 10, 2013

(51) Int. Cl.
*G06K 15/02* (2006.01)
*G06F 3/12* (2006.01)

(52) U.S. Cl.
USPC ..................................... 358/1.14; 358/1.15

(58) Field of Classification Search
USPC ............... 358/1.1, 1.13, 1.14, 1.15, 400, 401, 358/434, 440
See application file for complete search history.

(56) References Cited

U.S. PATENT DOCUMENTS

| | | | |
|---|---|---|---|
| 7,483,175 B2* | 1/2009 | Ryan et al. | 358/1.9 |
| 7,869,071 B2* | 1/2011 | Liu | 358/1.15 |
| 2008/0062454 A1* | 3/2008 | Bostick et al. | 358/1.15 |
| 2009/0021770 A1 | 1/2009 | Salgado | |
| 2012/0023593 A1* | 1/2012 | Puder et al. | 726/28 |

* cited by examiner

*Primary Examiner* — Thomas D Lee
(74) *Attorney, Agent, or Firm* — Ronald E. Prass, Jr.; Prass LLP

(57) ABSTRACT

An approach is provided for securing a print job. The approach involves determining a source of content of a requested print job. The approach also involves causing, at least in part, the requested print job to be designated as a secure print job based, at least in part, on the source of content of the requested print job. Examples of a source of content may include any of an application or a website.

8 Claims, 6 Drawing Sheets

| | Type | Description | Value |
|---|---|---|---|
| 117 | Website | Website for submitting payroll information. | http://www.xpayrollx.com |
| | Website | Website for managing employee information. | http://www.xemployeemanagerx.com |
| | Website | Employee benefits management. | http://www.xemployeebenefitsx.com |
| 115 | Application | HR management application. | PeopleSoft |
| 121 | Application | Quickbooks finical application. | Quickbooks |

| Type | Description | Value | Client Configured (Can be edited) |
|---|---|---|---|
| Website | Website for submitting payroll information. | http://www.xpayrollx.com | No |
| Website | Website for managing employee information. | http://www.xemployeemanagerx.com | No |
| Website | Employee benefits management. | http://www.xemployeebenefitsx.com | No |
| Application | HR management application. | PeopleSoft | No |
| Application | Quickbooks finical application. | Quickbooks | No |
| Website | My bank | http://www.HSBC.com* | Yes |
| Application | Tax software | TurboTax | Yes |

FIG. 4

METHOD AND APPARATUS FOR SECURING A PRINT JOB

FIELD OF DISCLOSURE

The disclosure relates to an apparatus and method for securing a print job based, at least in part, on a source of content of a requested print job.

BACKGROUND

Printing service providers and device manufacturers are continually challenged to deliver value and convenience to consumers by, for example, providing compelling printing services. Users often print from various applications and websites that contain sensitive information. Some print management systems enable a user to manually designate that a print job containing sensitive information be a secure print job. A secure print job often involves sending a print job request to a printer, and the print job may only be released and allowed to be printed upon entry of a code or personal identification number, either at the printer or by way of another print management user interface, to enable the printer to print the secure print job. Conventionally, when a user would like to print content from a sensitive location that should be securely printed, the user must remember to set the print job up for secure printing each time a secure print job is desired. Users often forget to set sensitive print jobs up for secure printing thereby causing un-secure print jobs to be sent to a printer.

SUMMARY

Therefore, there is a need for an approach for securing a print job based, at least in part, on a source of content of a requested print job.

According to one embodiment, a method for securing a print job comprises determining a source of content of a requested print job. The method also comprises causing, at least in part, the requested print job to be designated as a secure print job based, at least in part, on the source of content of the requested print job.

According to another embodiment, an apparatus for securing a print job comprises at least one processor, and at least one memory including computer program code for one or more computer programs, the at least one memory and the computer program code configured to, with the at least one processor, cause, at least in part, the apparatus to determine a source of content of a requested print job. The apparatus is also caused to cause, at least in part, the requested print job to be designated as a secure print job based, at least in part, on the source of content of the requested print job.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments of the invention are illustrated by way of example, and not by way of limitation, in the figures of the accompanying drawings:

FIG. 3 is a diagram of an administrator level user interface, according to one embodiment;

FIG. 4 is a diagram of a non-administrator level user interface, according to one embodiment;

DETAILED DESCRIPTION

Examples of a method, apparatus, and computer program for securing a print job based, at least in part, on a source of content of a requested print job are disclosed. In the following description, for the purposes of explanation, numerous specific details are set forth in order to provide a thorough understanding of the embodiments of the invention. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

Figure 1:
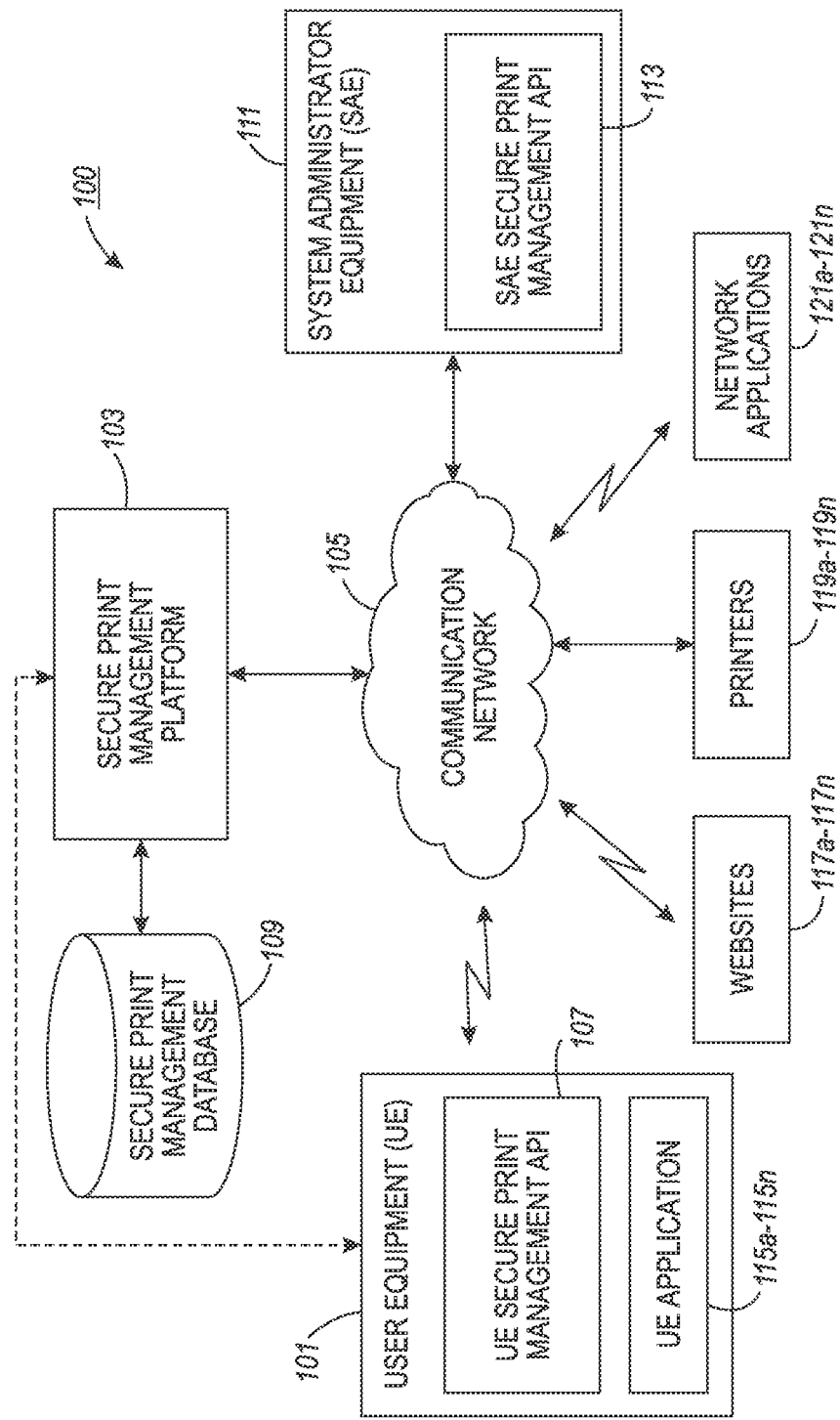
FIG. 1 is a diagram of a system capable of securing a print job based, at least in part, on a source of content of a requested print job, according to one embodiment.

FIG. 1 is a diagram of a system capable of securing a print job based, at least in part, on a source of content of a requested print job, according to one embodiment. Users often print from various applications and websites that contain sensitive information. Some print management systems enable a user to manually designate that a print job containing sensitive information be secure. A secure print job often involves sending a print job request to a printer, and the print job may only be released and allowed to be printed upon entry of a code or personal identification number, either at the printer or by way of another print management user interface, to enable the printer to print the secure print job. Conventionally, when a user would like to print content from a sensitive location that should be securely printed, the user must remember to set the print job up for secure printing each time a secure print job is desired. Users often forget to set sensitive print jobs up for secure printing thereby causing un-secure print jobs to be sent to a printer.

To address this problem, a system 100 of FIG. 1 introduces the capability to secure a print job based, at least in part, on a source of content of a requested print job. The system 100, accordingly, facilitates securing a print job in a manner that is independent of any type of printing device as well as any print drivers associated with a printing device. Additionally, the system 100 facilitates centrally managed print security administration that may enable print jobs to be made secure without requiring lower level user input.

As shown in FIG. 1, the system 100 comprises a user equipment (UE) 101, a secure print management platform 103, a system administrator equipment (SAE) 111, one or more websites 117a-117n (collectively referred to as website 117), one or more printers 119a-119n (collectively referred to as printer 119), and one or more network applications 121a-121n (collectively referred to as network application 121), all having connectivity to a communication network 105.

According to various embodiments, the UE 101 may have a UE secure print management API 107 onboard the UE 101. Additionally, or alternatively, the UE 101 may have access to a remote secure print management API 207 (discussed below with regard to FIG. 2) that may serve the same function as the UE secure print management API 107.

In one or more embodiments, the UE 101 issues a print job request to print content from any website or application. For example, the UE 101 may have one or more UE applications 115 onboard the UE 101 and/or have connectivity to one or more network applications 121 by way of the communication network 105. By way of example, a network application may refer to a cloud-based or network accessible application that is not stored or installed on the UE 101. Alternatively, or in addition to the UE 101 having connectivity to the one or more UE applications 115 and/or network applications 121, the UE 101 may have the ability to access one or more websites 117 by way of communication network 105, for example.

Regardless of whether the UE 101 is outfitted with the UE secure print management API 107, or has connectivity to the remote secure print management API 207, the issue print job request is sent to the secure print management platform 103. According to various embodiments, the secure print management platform 103 may be remote from the UE 101 or onboard the UE 101.

Secure print management platform 103 receives the print job request from the UE 101 and determines the source of the content that is to be printed. For example, the secure print management platform 103 is configured to determine a website address associated with a website 117 that is the source of content of the print job request issued by the UE 101. Or, the secure print management platform 103 is configured to determine a particular application (e.g., UE application 115 or network application 121) that is the source of the content that is to be printed by the print job request issued by the UE 101.

In one or more embodiments, upon determining the source of the content to be printed by the issued print job request, the secure print management platform 103 searches a secure print management database 109 for any matching applications or websites that may be designated as secure content sources, and upon determining a match between any of the secure content sources stored in the secure print management database 109, the secure print management platform 103 causes the print job request to be sent to one or more of the printers 119 as a secure print job.

The secure print management database 109 comprises one or more lists of secure applications and websites that are created by, for example, a user of the UE 101 by way of the UE secure print management API 107 or the remote secure print management API 207, and/or a print governance administrator. The print governance administrator may be, for example, a user having an authority level that enables the administrator to effect changes to various network and device settings, that a standard user of UE 101 would not have access to change.

The print governance administrator may access the secure print management platform 103, by way of the SAE 111, for example. The SAE 111 may have an SAE secure print management API 113 that may have access to the secure print management platform 103. Or the SAE 111, like the UE 101, may have access to the remote print management API 207, discussed above. Alternatively, the print governance administrator may access the secure print management platform 103 using a UE 101, for example, by logging in to the secure print management platform or any of the secure print management API's 107, 113, 207, for example. In other words, the SAE 111 may be any of the same type of equipment as a UE 101, and a UE 101 may be deemed an SAE 111 if in the hands of a print governance administrator.

According to various embodiments, the print governance administrator may, by way of the SAE 111 for example, create a list of application 115/121 and websites 117 that are to be designated as secure content sources and stored in the in the secure print management database 109. For example, the list of secure content sources may be created by way of the SAE secure print management API 113 or the list may be created by remotely accessing the remote secure print management API 207. Secure content sources may be of interest to a high level authority, or company, for example, if that authority or company wants to control whether print jobs containing content from certain locations (i.e. applications and/or websites) should made secure to eliminate the potential for confidential information from being distributed by accident.

In one or more embodiments, a user of the UE 101 may also have the ability to add additional applications and websites as secure content sources to the secure content source list stored in the secure print management database 109. For example, a secure content source designation made by the UE 101 may be by way of the UE secure print management API 107 or by remotely accessing the remote secure print management API 207.

In one or more embodiments, any secure content source list created or modified by way of the UE secure print management API 107, SAE secure print management API 113 and/or the remote secure print management API 207 is processed by the secure print management platform 103 and stored in the secure print management database 109.

In one or more embodiments, if the secure print management platform 103, upon searching the secure print management database 109 determines that there is not a matching content source in the secure print management database 109, the secure print management platform 103 may cause an option to be presented that asks of the user wants to have the source of content of this particular print job be stored as a secure content source in the secure print management database 109 for future use.

According to various embodiments, the system 100 is subject to a hierarchy of authority. For example, secure content sources that are designated by way of the SAE 111 may be modified only by users having an authority level high enough to access and modify such entries. Secure content sources that are designated by way of the UE 101 may be modified by one or more of a user of the UE 101 having an authority level lower than a user of the SAE 111 and a user of the SAE 111 having a higher level of authority. But, for example, a user of the UE 101 having the lower level of authority may not have the ability to edit any secure content sources that are added to the secure print management database 109 by way of the SAE 111.

According to various embodiments, should the secure print management platform 103 determine that a source of content of the print job request is a secure content source as designated in the secure print management database 109, the secure print management platform 103 will cause a secure print of the print job request issued by the UE 101 to be printed by one or more of the printers 119.

In one or more embodiments, once the print job request is released by the secure print management platform 103 and sent to the one or more printers 119, the end user (i.e., the user at the printer whether it be the user of the UE 101 that initiated the print job request or a receiving user that is at the printer) may be required to enter a secure print job code or PIN to enable the print job request, now designated as a secure print job, to be printed by the one or more printers 119. The secure print job code may be associated with a user profile of the user of the UE 101 that initiated the print job request, and then saved and stored by the secure print management platform 103 for future use, or the secure print job code may be created every time a print job request that is designated as a secure print job by the secure print management platform 103 is made by the UE 101.

In one or more embodiments, a secure print job code that matches either the stored secure print job code or a newly issued secure print job code is entered at the printer 119 to release the secure print job and cause the secure print job to be printed. Or, in another embodiment, the secure print job code may be entered by another user interface separate from the printer 119 to allow the secure print job to be released and printed by the printer 119. Or, for example, a secure print job code may be associated with the UE 101 itself, and a detected presence of the UE 101 within a preset proximity of the printer 119 may cause the secure print job code to be sent to the secure print management platform 103, or cause the secure print management platform 103 to release the secure print job based on the detected position of the UE 101. By way of example, the position of the UE 101 may be detected or determined by way of any of RFID, other short range radio communication, WIFI communication, GPS location determination, etc.

By way of example, the communication network 105 of system 100 includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, secure print management platform 103, secure print management database 109, SAE 111, websites 115, network applications 121, and printers 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
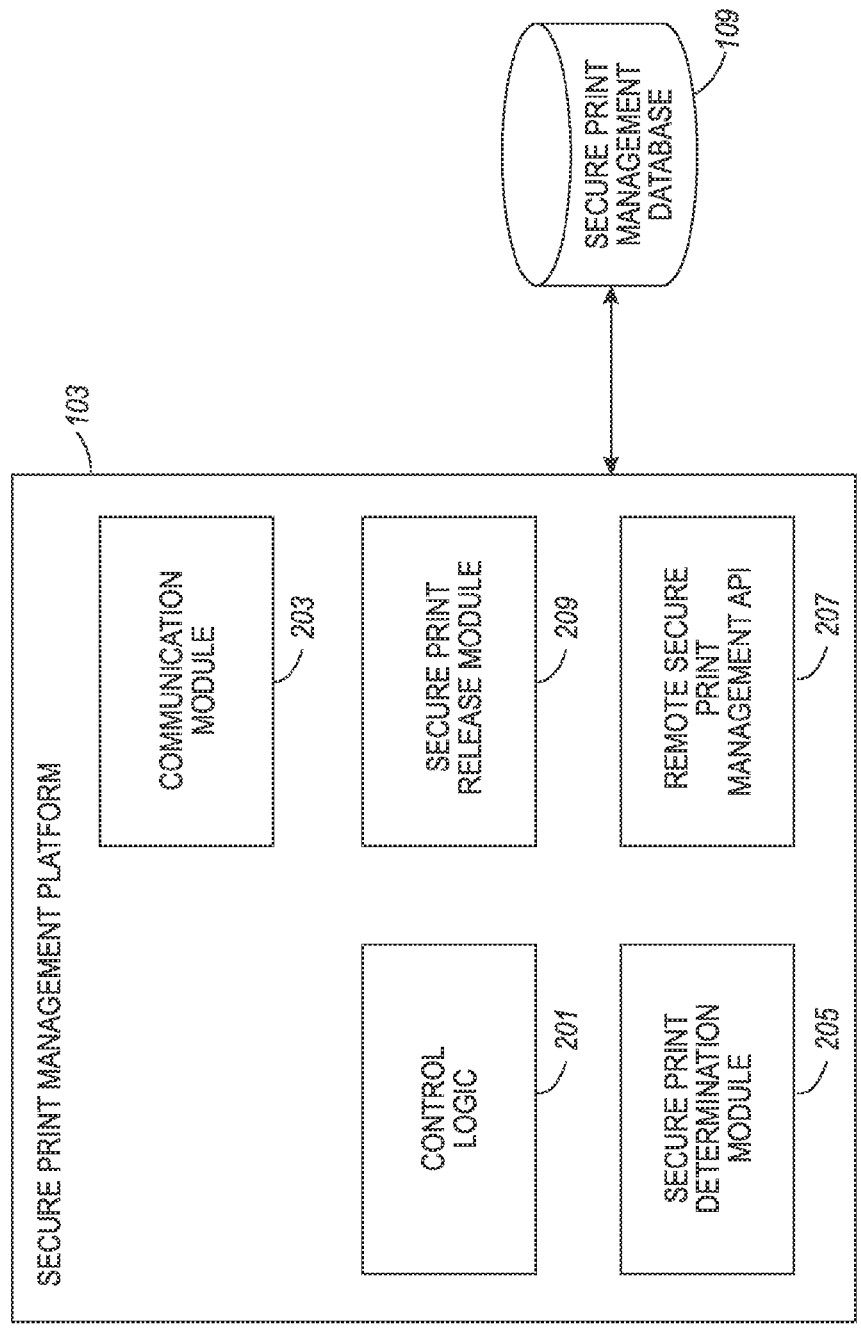
FIG. 2 is a diagram of the components of secure print management platform, according to one embodiment.

FIG. 2 is a diagram of the components of secure print management platform 103, according to one embodiment. By way of example, the secure print management platform 103 includes one or more components for securing a print job based, at least in part, on a source of content of a requested print job. It is contemplated that the functions of these components may be combined in one or more components or performed by other components of equivalent functionality. In this embodiment, the secure print management platform 103 includes a control logic 201, a communication module 203, a secure print determination module 205, a remote secure print management API 207, and a secure print release module 209. The secure print management platform 103, as discussed above, has connectivity to the secure print management database 109.

According to various embodiments, the secure print management platform receives a print job request from the UE 101 discussed above by way of the communication module 203. The control logic 201 instructs the secure print determination module 205 to determine the source of content of the received print job request. The source of content of the received print job request, as discussed above, may be any website or application, for example. The secure print determination module 205 communicates with the secure print management database 109 to search the secure print management database 109 for any matching secure sources of content that have been previously designated as being secure content sources by way of either the UE 101 or the SAE 111, as discussed above. If the secure print determination module 205 determines that a match exists between the determined source of content of the print job request and any secure content sources stored in the secure print management database 109, the secure print determination module causes the requested print job to be designated as a secure print job.

The control logic 201 sends the secure print job to a printer such as any one or more of the printers 119 discussed above where a user may enter a secure print job code, or a secure print job code may be provided by another means, as discussed above. Upon entry or receipt of the secure print job code, the communication module 203 receives the secure print job code and the control logic 201 instructs the secure print release module 209 to determine if the received secure print job code matches a stored secure print job code or a secure print job code input at the time of the print job request by way of the UE 101. As discussed above, a secure print job code may be stored and associated with the UE 101 or a user profile of a user of the UE 101 for future use. If the secure print release module 209 determines that the received secure print job code matches, then the secure print release module 209 enables the printer 119 to print the secure print job request. Accordingly, the control logic 201 communicates such a release to the printer 119 by way of the communication module 203.

In one or more embodiments, the secure print management platform 103 may comprise a remote secure print management API 207 that may be accessible by way of the UE 101 and/or the SAE 111. The remote secure print management API 207 may enable a print job to be requested, for example, when the UE 101 is connected to the network 105, and may also enable any of a user of the UE 101 and/or the SAE 111, depending on a determined level of authority, to modify one or more lists of secure content sources that are stored in the secure print management database 109. The remote secure print management API 207 may also facilitate the entry and storage of secure print job codes and user profiles that may include various secure print job codes and/or secure content sources in the secure print management database 109.

In one or more embodiments, the remote secure print management API 207 may communicate with any of the UE secure print management API 107 and/or the SAE secure print management API 113 for modifying data stored in the secure print management database 109. Alternatively, any changes to any data stored in the secure print management database 109 may be made directly by way of the UE secure print management API 107 and/or the SAE secure print management API 113 without communicating with the remote secure print management API 207, regardless of whether the secure print management platform 103 includes the remote secure print management API 207 or not.

FIG. 3 is a diagram of a user interface for a print governance administrator, according to one embodiment. A user interface 300 illustrates a list 301 that is accessible by a high level of authority to designate various content sources 303 as secure content sources by adding the content sources 303 to the list 301. For example, a print governance administrator may access the list 301 by way of the SAE 111, discussed above. Websites 117 and applications 115/121 may be added to the list 301. Once added to the list 301, the secure content sources 303 may also be associated with a description 305 and a value/address 307. The value/address 307 may be used by the secure print management platform 103 for determining whether a source of content associated with an issued print job request matches any of the secure content sources 303 included in the list 301.

For example, the secure print management platform 103 may determine a web address of a particular website 117 that is the source of content of a print job request, the secure print management platform 103 may determine a name of a particular application 115/121 that is the source of content of the print job request and compare the address or name to the value/address 307 included in the list 301. The comparison that the secure print management platform 103 may include a level of tolerance to accommodate a variance in web address or determined application name. For example, if a website address is www.xpayroll.com and the value stored in the list for the website 117 designated as a secure content source is www.payrollxx.com, or some other value that includes http:, or additional portions of an address, or is an obvious variant, the secure print management platform 103 may still determine the print job request should be a secure print job based on the determined address or values being close to the stored values, though not an exact match.

As discussed above, the secure content sources 303 added to the list 301 may only be modified by a user having an authority level high enough for such access. The secure content sources 303 in the list 301 may not be editable by a user of the UE 101 unless the user has a level of authority high enough to make such modifications.

FIG. 4 is a diagram of a user interface for a user of the UE 101, discussed above, according to one embodiment. A user interface 400 illustrates the list 301, discussed above with UE 101 added secure content sources. It should be noted that while the list 301 is illustrated, another list of separately created secure content sources may be created by way of the UE 101, or by a user having a level of authority lower than a user that created the list 301, discussed above that is associated with the UE 101 or a user profile of a user of the UE 101 that may be usable for determining whether a source of content is a secure content source.

In this embodiment, the secure content sources 303 by added to the list 301 by way of the SAE 111 are locked and not configurable as indicated in column 401. However, additional secure content sources 403 may be added by way of the UE 101. The secure content sources 303 are not editable because they were added to the list 301 by way of the SAE 111 or a user having higher authority than a user having access to the user interface 400. Accordingly, the additional secure content sources 403 may be edited by way of the user interface 400 as indicated column 401.

Figure 5:
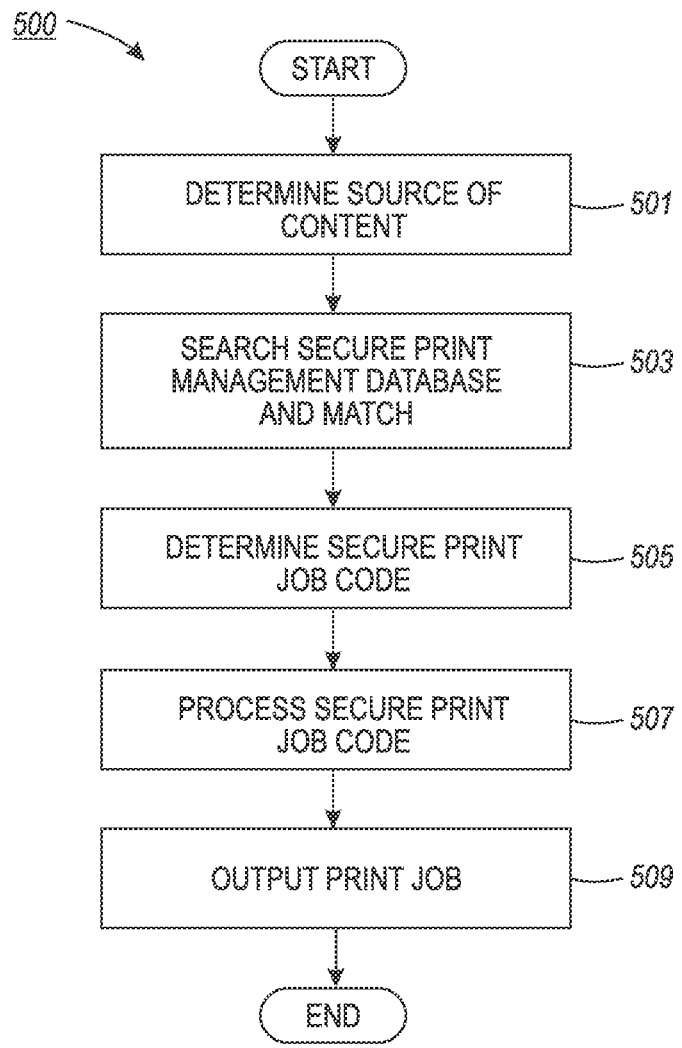
FIG. 5 is a flowchart of a process for securing a print job based, at least in part, on a source of content of a requested print job, according to one embodiment.
Figure 6:
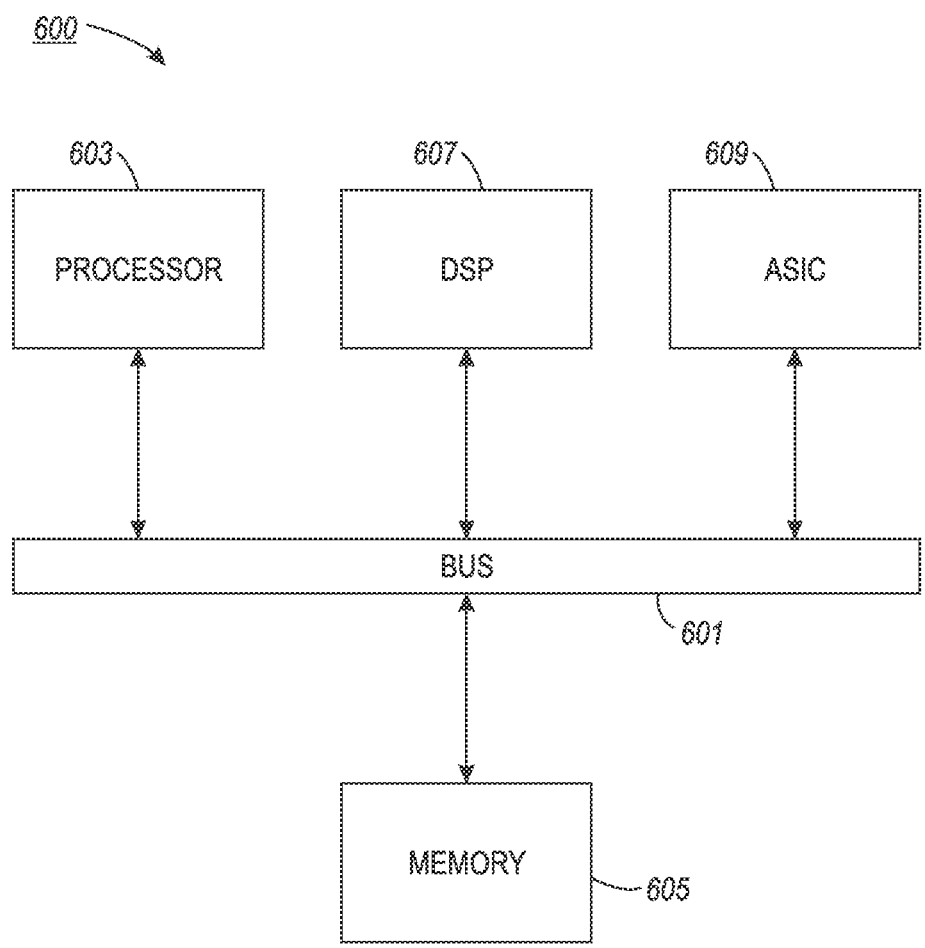
FIG. 6 is a diagram of a chip set that can be used to implement an embodiment.

FIG. 5 is a flowchart of a process for securing a print job based, at least in part, on a source of content of a requested print job, according to one embodiment. In one embodiment, the secure print management platform performs the process 500 and is implemented in, for instance, a chip set including a processor and a memory as shown in FIG. 6. In step 501, the secure print management platform 103 receives a print job request from the UE 101 discussed above. The secure print management platform 103 determines a source of content of the print job request. The source of content, for example, may be any of a website 117 or application 115/121, as discussed above.

Then, in step 503, the secure print management platform 103 determines whether the determined source of content is of the print job request is stored in the secure print management database 109, discussed above, as previously being designated as a secure content source. If the secure print management platform 103 determines a match between the determined source of content and the stored secure content sources, the secure print management platform 103 causes the requested print job to be designated as a secure print job.

The process continues to step 505 in which the secure print management platform 103 receives a secure print job code by way of the printer 119 or other means, as discussed above. Next, in step 507, the secure print management platform 103 processes the received secure print job codes and determines whether the secure print job code matches a stored secure print job code. In one or more embodiments, if the secure print management platform 103 determines that the received secure print job code does not match a stored secure print job code, then the secure print management platform 103 may provide an option to save the received secure print job code for future use.

Upon verification that the received secure print job code matches a stored secure print job code, the secure print management platform 103 causes the secure print job to be output by the printer 119 in step 509.

The processes described herein for securing a print job based, at least in part, on a source of content of a requested print job may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 6 illustrates a chip set or chip 600 upon which an embodiment may be implemented. Chip set 600 is programmed to secure a print job based, at least in part, on a source of content of a requested print job as described herein may include, for example, bus 601, processor 603, memory 605, DSP 607 and ASIC 609 components.

The processor 603 and memory 605 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of securing a print job based, at least in part, on a source of content of a requested print job.

In one or more embodiments, the chip set or chip 600 includes a communication mechanism such as bus 601 for passing information among the components of the chip set 600. Processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 603 performs a set of operations on information as specified by computer program code related to securing a print job based, at least in part, on a source of content of a requested print job. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 601 and placing information on the bus 601. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 603, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 603 and accompanying components have connectivity to the memory 605 via the bus 601. The memory 605 may include one or more of dynamic memory (e.g., RAM, magnetic disk, writable optical disk, etc.) and static memory (e.g., ROM, CD-ROM, etc.) for storing executable instructions that when executed perform the inventive steps described herein to secure a print job based, at least in part, on a source of content of a requested print job. The memory 605 also stores the data associated with or generated by the execution of the inventive steps.

In one or more embodiments, the memory 605, such as a random access memory (RAM) or any other dynamic storage device, stores information including processor instructions for securing a print job based, at least in part, on a source of content of a requested print job. Dynamic memory allows information stored therein to be changed by system 100. RAM allows a unit of information stored at a location called a memory address to be stored and retrieved independently of information at neighboring addresses. The memory 605 is also used by the processor 603 to store temporary values during execution of processor instructions. The memory 605 may also be a read only memory (ROM) or any other static storage device coupled to the bus 601 for storing static information, including instructions, that is not changed by the system 100. Some memory is composed of volatile storage that loses the information stored thereon when power is lost. The memory 605 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 603, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the invention is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:

1. A method for printing, comprising:
   receiving, with a processor, a print job request from a user to print content on a printing device;
   identifying, with the processor, a source of the content to be printed according to the received print job request, the identified source being one of an identifiable website or an identifiable application;
   determining, with the processor, that the source of the content to be printed is a secure source;
   designating, with the processor, the received print job request as a secure print job based on the determining;
   completing the received print job request according to a protocol for handling the secure print job; and
   a determination that the identifiable website is a secure source being based on an address of the website;
   receiving, with the processor, a secure print job code, the protocol for handling the secure print job comprising processing, with the processor, the received secure print job code to authorize completion of the secure print job by the printing device, the processing, with the processor, comprising determining to print the secure print job by the printing device based on a valid match of a stored secure print job code with the received secure print job code, the received secure print job code being input at a user interface integral to the printing device.

2. The method of claim 1, the secure print job code being received from a mobile device detected in a presence of the printing device.

3. The method of claim 1, further comprising:
   providing an option to the user to save the received secure print job code in a storage device that is accessible by the processor; and
   saving the received secure print job code in a memory in the storage device based on a received selection from the user to save the received secure print job code.

4. The method of claim 1, further comprising providing an editable database comprising a list of sources of content that are designated as secure sources,
   the determining that the source of the content to be printed is a secure source comprising comparing, with the processor, the source of the content to be printed with the list of sources of content in the editable database to find a match.

5. An apparatus for printing, comprising:
   at least one processor; and
   at least one memory including computer program code for one or more programs,
   the at least one memory and the computer program code configured to, with the at least one processor, cause the apparatus to perform the steps of:
   receiving, with the at least one processor, a print job request from a user to print content on a printing device;
   identifying, with the at least one processor, a source of the content to be printed according to the received print job request, the identified source being one of an identifiable website or an identifiable application;
   determining, with the at least one processor, that the source of the content to be printed is a secure source;
   designating, with the at least one processor, the received print job request as a secure print job based on the determining;
   completing the received print job request according to a protocol for handling the secure print job; and
   a determination that the identifiable website is a secure source being based on an address of the website,
   receiving a secure print job code, the protocol for handling the secure print job comprising processing the received secure print job code to authorize completion of the secure print job by the printing device, the processing comprising determining to print the secure print job by the printing device based on a valid match of a secure print job code with the received secure print job code, the received secure print job code being input at a user interface integral to the printing device.

6. The apparatus of claim 5, the secure print job code being received from a mobile device detected in a presence of the printing device.

7. The apparatus of claim 5, the apparatus further performing the steps of:
   providing an option to the user to save the received secure print job code in a storage device that is accessible by the processor; and
   saving the received secure print job code in a memory in the storage device based on a received selection from the user to save the received secure print job code.

8. The apparatus of claim 5, the apparatus further performing the steps of providing an editable database comprising a list of sources of content that are designated as secure sources,
   the determining that the source of the content to be printed is a secure source comprising comparing the source of the content to be printed with the list of sources of content in the editable database to find a match.

* * * * *